United States Patent [19]

Benjamin et al.

[11] 4,196,226

[45] Apr. 1, 1980

[54] ALKALI METAL ALUMINUM PHOSPHATE

[75] Inventors: Robert E. Benjamin; Thomas E. Edging, both of Nashville, Tenn.

[73] Assignee: Stauffer Chemical Company, Westport, Conn.

[21] Appl. No.: 899,445

[22] Filed: Apr. 24, 1978

Related U.S. Application Data

[63] Continuation of Ser. No. 703,872, Jul. 9, 1976, abandoned.

[51] Int. Cl.$^2$ .............................................. A21D 2/02
[52] U.S. Cl. .................................. 426/551; 427/215; 423/267; 423/306; 426/552; 426/553; 426/554; 426/563; 426/653
[58] Field of Search ............... 426/551, 552, 553, 554, 426/563, 653, 97, 285, 496, 650; 423/306, 267, 275; 427/215

[56] References Cited

U.S. PATENT DOCUMENTS

| | | | |
|---|---|---|---|
| 2,291,609 | 8/1942 | Cobbs | 426/97 |
| 2,550,491 | 4/1951 | MacDonald | 426/563 |
| 2,631,102 | 3/1953 | Hubbard et al. | 426/97 |
| 3,501,314 | 3/1970 | Kichline et al. | 426/563 |
| 4,054,678 | 10/1977 | Benjamin et al. | 426/563 |

*Primary Examiner*—S. Leon Bashore
*Assistant Examiner*—Michael Goldman
*Attorney, Agent, or Firm*—Paul J. Juettner

[57] ABSTRACT

Alkali metal aluminum phosphate granules having a calcium rich outer surface are provided which are characterized by improved flow and dusting properties as well as lower hygroscopicity without a change in leavening acid performance. The product can be used as a leavening acid in moist doughs, and liquid batters, such as pancake batters and other premixed liquid batter. Longer storage life for liquid or dry products is possible.

27 Claims, 6 Drawing Figures

ELECTRON PROBE ANALYSIS ON CROSS SECTION OF
PARTICLE OF THE INVENTION (1000X)

CALCIUM X-RAY IMAGE

PHOSPHORUS X-RAY IMAGE

ALUMINUM X-RAY IMAGE

ELECTRON PROBE ANALYSIS ON CROSS SECTION OF
PARTICLE FROM U.S. 2,550,490 (462X)

100μ

PHOSPHORUS X-RAY IMAGE

CALCIUM X-RAY IMAGE

ALUMINUM X-RAY IMAGE

ALKALI METAL ALUMINUM PHOSPHATE

This is a continuation, of application Ser. No. 703,872 filed July 9, 1976, now abandoned.

BACKGROUND OF THE INVENTION

The present invention relates to alkali metal aluminum phosphate granules having a calcium rich layer thereon characterized by improved flow and dusting properties without a loss in leavening acid performance properties. The product can be used as a leavening acid in moist doughs and liquid batters, such as pancake batters and other premixed liquid batters.

Crystalline sodium aluminum phosphate (or SALP) was first disclosed in U.S. Pat. No. 2,550,490, and an early baking powder composition incorporating SALP was disclosed in U.S. Pat. No. 2,550,491. U.S. Pat. No. 2,550,490 specifically discloses a SALP with a Na:Al:-$PO_4$ ratio of 1:3:8. Since that time, several modifications of sodium aluminum phosphate have been developed which give different reactivities and performance characteristics. These include a dehydrated SALP, U.S. Pat. No. 2,957,750; a 3:3:8 SALP, U.S. Pat. No. 3,223,479; a 3:2:8 SALP U.S. Pat. No. 3,501,314, a 2:3:6 SALP, U.S. Pat. No. 3,574,536; an amorphous SALP, U.S. Pat. No. 2,995,421; a 3:3:9 SALP, U.S. Pat. No. 3,726,962 and the continuous crystallization of SALP, U.S. Pat. No. 3,311,448.

Sodium aluminum phosphate is a well known leavening agent in the baking industry. it finds use in baking powders, self-rising mixes, preleavened pancake flours and mixes, prepared biscuit mixes, and prepared cake mixes. (See U.S. Pat. Nos. 2,550,491, 3,109,738, 3,041,177, 3,096,178). It is also used as a melt controlling additive in cheese and as a meat binding agent.

It is taught in U.S. Pat. No. 2,550,490 that the speed of the gas developing reaction of the sodium aluminum phosphate can be accelerated by the use of an accelerator such as monocalcium phosphate. The monocalcium phosphate may be formed on the surface of the sodium aluminum phosphate crystals. This can be accomplished by preparing the SALP as usual but omitting an alcohol wash to remove excess phosphoric acid. The excess phosphoric acid is then neutralized with hydrated lime. Specifically, the sodium aluminum phosphate was prepared by dissolving aluminum in phosphoric acid and adding sodium carbonate. After concentrating to a thick slurry, the slurry was added to a mixer containing hydrated lime. Vigorous agitation was continued until the mixture solidified into small granular lumps. After drying, the product was milled to provide a dry, nonhydroscopic powder having a neutralizing value of 100.4. It was tested in the baking of biscuits and found to have baking characteristics equal to that of standard commercial phosphate-alum baking powders. Results of baking at a neutralizing value of 90 showed the baked biscuits to have a specific volume of 2.6, a pH of 7.4 and a fine open grain structure.

These results required milling of the SALP to obtain particle sizes sufficiently small to be usable in baking.

Sodium aluminum phosphate is generally employed in baking applications in a finely divided state due to its substantial insolubility. Furthermore, if relatively large particles of sodium aluminum phosphate are used in bakery applications, they can impart an undesirable, gritty property. Sodium aluminum phosphate has several inherent deficiencies the most serious of which is dusting and hygroscopicity. Sodium aluminum phosphate dust is very light and rapidly permeates the air in food processing plants, creating cleaning and sanitation problems and unsatisfactory working conditions for the employees. An additional problem in handling sodium aluminum phosphate is that the finely divided particles do not flow easily.

Sodium aluminum phosphate is also an inherently hygroscopic material which will absorb a large quantity of atmospheric moisture, usually about 28-29% by weight. Originally produced, SALP is a dry, white crystalline product. If permitted to stand exposed in a hot, humid atmosphere, it rapidly absorbs moisture, first forming water droplets or caking at the surface, then becoming what may be termed a viscous semi-fluid. Commercially, this phenomenon is minimized somewhat by the use of sealed, air-tight containers. Nevertheless, the precautions required are time consuming and expensive, and in practical applications, the problem remains a significant disadvantage.

Several proposals have been made in the past for improving the physical handling properties of sodium aluminum phosphate, particularly directed to improving flow characteristics and dust properties. These approaches have generally been directed to agglomerating or pelletizing the SALP as disclosed, for example, in U.S. Pat. No. 3,620,972 which utilizes water as an agglomerating medium. Other methods have involved the employment of various binders such as sugars and crystallizing syrups. Still other approaches utilize the addition of small amounts of colloidal $SiO_2$ or tricalcium phosphate to the SALP as flow conditioners to improve physical handling properties.

In connection with SALP 3:2:8 disclosed in U.S. Pat. No. 3,501,314, it is known to dry blend a flow conditioner with dry SALP crystals. The flow conditioner can be any alkali or alkaline earth metal phosphate, calcium hydroxide or aluminum oxide. It is taught that the dry flow conditioner particles are adhered to dry SALP particles as a dry coating. The flow conditioners are taught to increase flowability and reduce hygroscopicity. However, flow conditioners in general are known to only improve handling characteristics to a slight degree.

U.S. Pat. No. 3,255,073 to Blanch et al. describes a potassium modified sodium aluminum acid phosphate having decreased hygroscopicity. This result is accomplished by modifying the original sodium aluminum phosphate molecule with the introduction of potassium. The potassium is explained as replacing hydrogen atoms in the crystalline lattice of sodium aluminum phosphate. This improved potassium modified sodium aluminum phosphate is described as having hygroscopic properties wherein it does not increase in weight by more than about 20%, preferably not more than about 10% of its original weight during continued exposure at 35° C. and 75% relative humidity for 140 hours.

An improvement over U.S. Pat. No. 3,205,073 is U.S. Pat. No. 3,411,872 to Post et al. which attempts to improve the flow characteristics of Blanch et al's potassium modified sodium aluminum phosphate by incorporating the potassium ions in a solvent suspension of an alkanol.

A further improvement over U.S. Pat. No. 3,205,773 is disclosed in U.S. application Ser. No. 671,769, filed Mar. 30, 1976 to R. Benjamin et al. In that application, a specific ratio of sodium and potassium is used to prepare a potassium modified SALP. The improved SALP product is characterized by increased density and reduced dusting properties. Among the advantages accrued thereby, are ease of packaging, use of smaller bags that palletize more easily, decreased hygroscopicity and improved flow characteristics. All of these properties enable better handling, in general, especially under conditions of high humidity.

BRIEF DESCRIPTION OF THE INVENTION

In accordance with the present invention, it has been found that a calcium treated sodium aluminum phosphate having improved handling characteristics and useful as a leavening agent in moist doughs and liquid batters can be prepared by contacting a slurry of a complex aluminum phosphate of the formula: $M_{(a)}Al_{(b)}H_{(c)}(PO_4)_{(d)}\cdot H_2O_{(e)}$, wherein M is a cation selected from the group consisting of sodium, potassium, ammonium and mixtures thereof, (a), (b), (c) and (d) being numbers, and (e) being from O to n, n being a number with a calcium compound followed by granulating the calcium treated product while drying under such conditions that a majority of the granulated particles are less than 840 micron (through 20 mesh) and at least 90% less than 2000 micron. There is provided granulated complex aluminum phosphate granules with at least a calcium rich outer surface. The process of the present invention can also be included as part of the processes for preparing SALP and potassium modified SALP. This involves contacting an alkali metal aluminum phosphate with a calcium compound subsequent to the initial formation of alkali metal aluminum phosphate crystals and prior to completion of the drying of the slurry. The granulation while drying is then accomplished.

The products of the invention show improved handling characteristics and as leavening acids improved holding and storage characteristics in moist doughs and liquid batters. Improved hygroscopicity means improved storage stability of dry blends.

DETAILED DESCRIPTION OF THE PRESENT INVENTION

Figure 1:
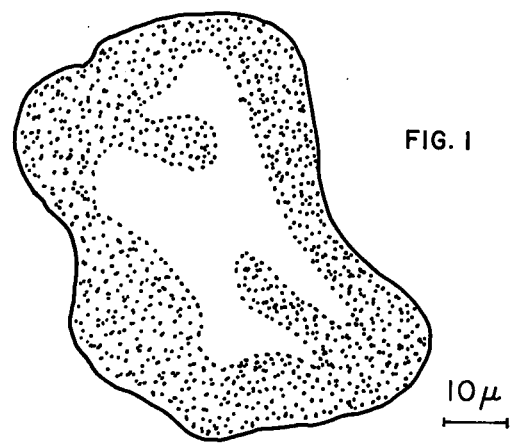
FIG. 1 is a representation of an electron probe analysis for calcium made on the cross-section of a particle of the present invention magnified 1,000 times.

The product of the present invention is a calcium treated alkali metal aluminum phosphate of the formula:

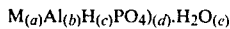

$$M_{(a)}Al_{(b)}H_{(c)}PO_4{}_{(d)}\cdot H_2O_{(e)}$$

wherein M is an alkali metal of sodium or potassium, an ammonium ion or mixtures thereof. Ammonium is generally included within the class of alkali metals because of its similar chemical properties. The letters (a), (b), (c) and (d) are numbers representing the various numerical ratios possible in preparing alkali metal aluminum phosphates. These numbers can be integers or fractions thereof. The letter e relates to the quantity of water of hydration present which can range from O upward. Representative ratios are shown in the discussion of the background of the invention. It is intended that this application cover only those ratios which will form an alkali metal aluminum phosphate. At present, two SALP's are commercially available as leavening acids, i.e., 1:3:8 and 3:2:8 and these are intended to be covered specifically. SALP compounds are traditionally prepared by mixing an alkali metal hydroxide or carbonate such as sodium, sodium hydroxide, potassium carbonate, potassium hydroxide, ammonium carbonate, ammonium hydroxide or mixtures thereof, with about 60–90% acid, preferably, about 85–88% and more preferably about 86% acid in an amount sufficient to provide the ratio of alkali metal to $PO_4$ which is desired. The selection of these ratios can be easily ascertained by one skilled in the the art. The temperature during this mixing period is generally maintained above 40° C. and below 100° C. This material is then treated with an aluminum compound such as alumina trihydrate. The aluminum compound is generally added incrementally. The temperature during aluminum addition can rise to about 140° C. and then drop to about 110° C.

At this point, the reaction product is usually cooled to about 60°–75° C. for about 15–30 minutes to form a slurry of crystalline alkali metal aluminum phosphate. The slurry is then directed to a Kneadermaster kneader conveyor blender where the product is dried and granulated simultaneously.

The Kneadermaster mixers or blenders comprise jacketed vessels having an operating pressure of about 80–120 psig of steam. Hot air at a temperature of about 300° C. is fed into the central portion of the vessel. The slurry of reaction product traverses the length of the Kneadermaster blender, moved along by rotating blades. A particular length of the Kneadermaster is designated as the "wet zone" and is indicative of the distance the slurry traverses in the Kneadermaster before becoming substantially particulate and dry in appearance. Some processes utilize a "short wet zone" or a "regular wet zone". In general, the length of the wet zone can be varied and is determined by the loss on ignition (LOI) of the final product. LOI is a measurement of the % weight loss of a 2 gram sample of the product when ignited in a muffle furnace at a temperature of about 750°–850° C. for a period of about 10 minutes. Variation in LOI can vary the rate of gas release of the product in a leavening system. LOI's can be varied to provide different rates for different leavening and systems.

The calcium treated alkali metal aluminum phosphate of the present invention can be prepared using any known acid soluble alkali metal aluminum phosphate material, the preferred materials being 1:3:8 and 3:2:8 SALP and more preferably 1:3:8 SALP.

For ease of description, the remaining description will relate to SALP (sodium aluminum phosphate) 1:3:8 though it is understood that this description applies to all aluminum phosphates generically encompassed by the invention unless otherwise stated.

After the initial formation of SALP crystals in a slurry and prior to drying in the reactor or by reslurrying dried SALP crystals, the SALP slurry is added to or has added to it a calcium compound such as calcium hydroxide. Any calcium compound can be used as long as it is reactable with the system and does not have a anion which will interfere with the reaction. Illustrative of such calcium compounds are calcium oxide, calcium hydroxide, calcium carbonate, and mixtures thereof. The preferred material is hydrated lime.

It is preferred to add the hydrated lime to the SALP slurry to prevent dusting losses. Addition is made incrementally with agitation at a temperature of 80°–100° C. The calcium compound can be added with equal effectiveness at any time after the initial formation of SALP crystals and before drying. It is preferred that the SALP slurry be cooled and that the slurry contain a high percentage crystals prior to calcium treatment. At least some free water or other solvent must be present for effective treatment.

It is critical that the calcium treated SALP be granulated while drying the product under such conditions that a majority of the particles are less than 840 microns (20 mesh) and 90% are less than 2000 micron (10 mesh). By majority is meant at least 50%, and preferably at least 60%. Less than 10% of the product as prepared is larger than 2000 microns. If proper granulation is not undertaken, large lumps are formed on drying (about 5000 micron and above) which must be milled in order to obtain a product having a working particle size distribution of less than about 60 mesh. The milled product has a faster rate of gas release than SALP and acts like a blend of SALP and monocalcium phosphate. If, however, the product is granulated while drying to a majority of less than 840 micron under such conditions that the large lumps are not allowed to form prior to complete drying the product has the same rate of gas release as SALP in a doughnut dough rate of reaction test but slower in a baking powder rate of reaction test, both tests being described hereinafter. Any soft lumps formed during the drying procedure can be broken and remain in the granulator until the drying is complete. Any large lumps should not be allowed to completely dry.

In theory, a calcium layer has been formed on the SALP which is frangible if milled. By granulating the product while drying the particles are sufficiently small that extensive milling is not required. Depending on the particle size range desired, a fraction such as on 60 mesh fraction, can be separated, milled and admixed with the remaining fraction, i.e., the through 60 mesh fraction to obtain a product of commercially acceptable particle size. Since most of the particles as produced are small (less than 2000 micron) so that substantial milling is not required, there is generally obtained a granule which has at least a calcium rich outer surface.

It has also been found that an improved potassium modified alkali metal aluminum phosphate granule having calcium enriched outer surface can be prepared. This product is characterized by a considerable improvement in dust properties and flow characteristics over SALP alone or with a flow conditioning agent without loss of baking performance. The potassium modified alkali metal phosphate is prepared by the controlled substitution of potassium ion for a portion of the sodium ion used in producing the sodium aluminum phosphate, as is disclosed in U.S. application Ser. No. 671,769 filed Mar. 30, 1976, the disclosure of which is incorporated herein by reference.

It appears that when controlled amounts of potassium ion are contacted with a mixture of sodium treated food grade phosphoric acid which is subsequently reacted with alumina trihydrate, ($Al_2O_3.3H_2O$), to produce sodium aluminum phosphate, changes in the crystal structure occur that appear to stabilize the crystal habit of the potassium modified sodium aluminum phosphate. The potassium modified SALP has better flow characteristics and less dust than the prior art SALP compositions, while maintaining reduced hygroscopic properties. This change in the crystal structure manifests itself in the form of a doublet pattern as shows by x-ray diffraction powder patterns. This doublet suggests that there may be direct substitution of potassium for some of the sodium within the alkali metal aluminum phosphate molecule.

In accordance with the present invention, the improved calcium treated potassium modified sodium aluminum phosphate is produced by contacting a food grade phosphoric acid with a sufficient amount of potassium hydroxide to provide an analysis of about 0.5 to about 1.2, more preferably 0.6 to about 1.0 weight percent of potassium oxide ($K_2O$) in the potassium modified SALP. Other potassium containing compounds can also be utilized, such as $K_2CO_3$, $KHCO_3$, $K_3PO_4$ and the like, with the proviso that the anion attached to the potassium not contaminate the reaction media or product.

It appears that the $K_2O$ analysis is a critical factor in helping to achieve changes in crystal structure of the final product which contributes to good flow and dust properties of the product.

The potassium treated phosphoric acid is then contacted with a sufficient amount of sodium carbonate ($Na_2CO_3$) to provide an analysis of about 2.4 to about 3.2, preferably about 2.6 to about 3 weight percent of sodium oxide ($Na_2O$) in the potassium modified SALP. The $Na_2CO_3$ is generally added in a dry or anhydrous state.

The temperature of the phosphoric acid should be maintained above about 40° C. and below about 100° C. to prevent crystallization of sodium and/or potassium phosphate.

Other sodium containing compounds can also be used, such as NaOH, $NaHCO_3$, $Na_3PO_4$ and the like, with the proviso that the anion attached to the sodium not contaminate the reaction media or product.

The order of addition of sodium and potassium compounds is not critical though it is preferred to add the potassium compound first.

The sodium-potassium treated phosphoric acid then has its temperature adjusted to a temperature within the range of from about 40° C. to about 100° C. and preferably approximately 80° C. and is contacted with a sufficient amount of an aluminum compound such as alumina trihydrate to provide a desired concentration of $Al_2O_3$ in the final product. The alumina trihydrate is generally contacted with the treated phosphoric acid under conditions agitation so that it is uniformly distributed throughout the treated acid.

The addition of finely divided alumina trihydrate is accomplished incrementally generally over a period such that the extensive boiling does not occur, i.e., at a rate of about 1–3% a minute. The temperature initially rises to about 120° to about 140° C. and then drops to about 110° C.

The reaction of the sodium-potassium treated phosphoric acid with alumina trihydrate produces a slurry of potassium modified sodium aluminum phosphate. The reaction generally takes from about 1 to about 3 hours at about 110° C. to complete.

The reactor is then cooled to about 60°-75° C. for about 15-30 minutes. A calcium compound such as hydrated lime is then incrementally added with mixing to the slurry of the potassium modified sodium aluminum phosphate. After thorough mixing, the reaction mass is held until the reaction subsides and then the reaction product is directed to a Kneadermaster blender or mixer, wherein the material is dried and granulated simultaneously.

The conditions of the Kneadermaster blender are maintained so that the dry calcium treated potassium modified SALP exiting the Kneadermaster has a loss on ignition (LOI) of about 16 to about 22 weight percent.

After exiting the Kneadermaster, the calcium treated SALP proceeds to a classification system wherein the product is classified by particle size in an air separator or other equivalent apparatus. Depending on the particle size desired, the larger size particles such as on 60 mesh can be separated, milled and reblended with the remaining material. The calcium treated potassium modified SALP product is then in a commercial form ready to be placed into large bins for packaging and shipping. The LOI of the finished calcium treated potassium modified SALP product is from about 16 to about 22 weight percent.

It is desirable to control the amount of excess phosphoric acid present in the reaction mixture after formation of SALP crystals. Since the reaction never goes to completion and since it is known that some of the added alumina trihydrate doesn't reach an excess of phosphoric acid is generally present. A greater excess of phosphoric acid is generally desired for the inclusion of larger amounts of calcium in the product. The acid is used in an excess ranging from about 0.1% to about 65%. This amount can be achieved by the addition of excess acid at the start of the reaction or to the crystal slurry. Preferably, the excess acid is achieved by decreasing the amount of aluminum used in the reaction. The amount of aluminum can be decreased to about 50% and preferably to about 75% and more preferably from about 85% to about 95% of the amount required to form a desired SALP with a desired alkali metal:Al:PO$_4$ ratio. If only the aluminum reactant is decreased, an excess of alkali metal ion is also present in the reaction mixture as well as excess phosphate ion. Evidence has been uncovered which shows that the excess alkali metal ion is part of the surface of the calcium treated SALP granule. It has also been noted that it appears that the alkali metal and calcium containing surface is less frangible than the surface containing less alkali metal. The latter can be achieved by using only an excess of phosphoric acid in the reaction mixture. It is, therefore, preferred to treat a system with calcium which has excess alkali metal compound as well as phosphoric acid. This can be effectively achieved by reducing the stoichiometric quantity of aluminum required in the reaction.

At least a portion of the excess acid is neutralized by the calcium compound. The calcium compound can also be added in excess of the amount needed to neutralize the excess acid.

It is theorized that the calcium compound is neutralizing excess phosphoric acid present in the reaction mixture. There is analytical evidence which appears to indicate that presence of monocalcium phosphate on the particle.

Figure 2:
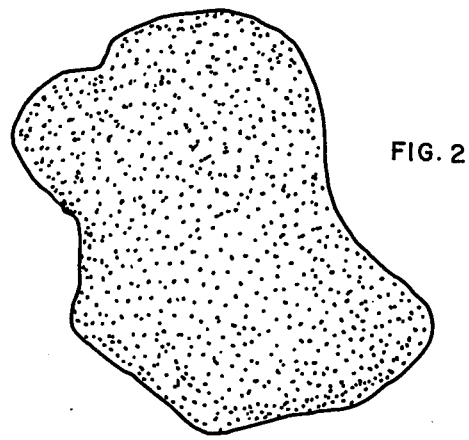
FIG. 2 is a representation of an electron probe analysis for phosphorus on the same particle cross-section as in FIG. 1.
Figure 3:
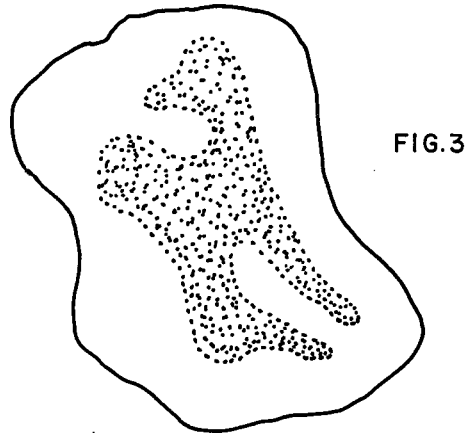
FIG. 3, is a representation of an electron probe analysis for aluminum on the same particle cross-section as in FIG. 1.

Referring specifically to the drawings, FIG. 1 is a representation of an electron probe for calcium of a cross-section of a single particle of the product of the present invention prepared in accordance with Example 3 embedded in epoxy resin. As it can be seen, calcium is abundant at the outer edge of the particle but deficient in the central portions. FIG. 2 shows the phosphorus content of the same particle in the same position as in FIG. 1 which is fairly evenly distributed over the entire cross-section of the particle. FIG. 3 shows the aluminum content of the same particle as FIG. 1. It is noted that the aluminum is abundant in the center of the particle where FIG. 1 shows the particle to be calcium deficient. The aluminum is deficient at the sides of the particle where the calcium is abundant. Since the particle is a cross-section, this evidence is interpreted to show that the particle has a calcium rich outer surface and a SALP inner core.

Figure 4:
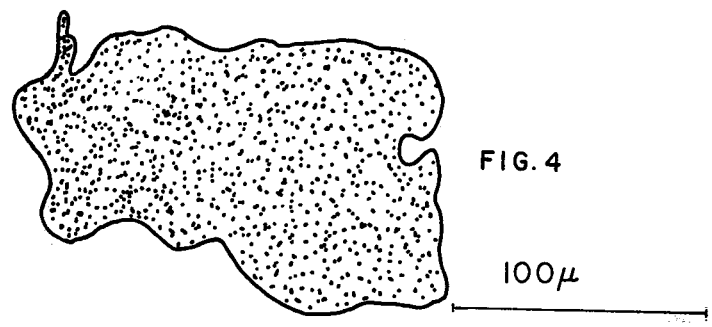
FIG. 4 is a representation of an electron probe analysis for calcium on the cross-section of a particle produced in accordance with U.S. Pat. No. 2,550,490, magnified 462 times.
Figure 5:
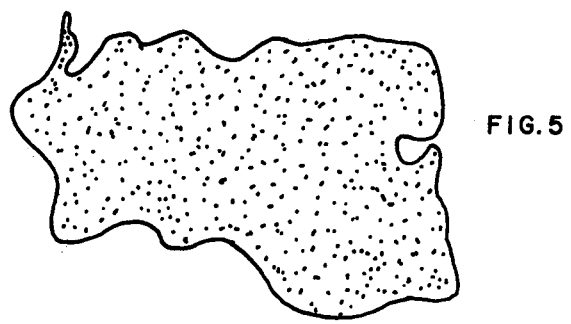
FIG. 5 is a representation of an electron probe analysis for phosphorus on the same particle cross-section as in FIG. 4.
Figure 6:
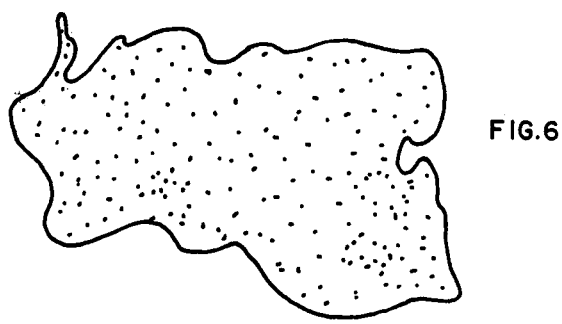
FIG. 6 is a representation of an electron probe analysis for aluminum on the same particle cross-section as in FIG. 4.

FIG. 5 shows a representation of an electron probe for calcium of the cross-section of a particle prepared in accordance with U.S. Pat. No. 2,550,490 as reported in Example 20 herewith. As it can be seen, calcium is evenly distributed over the entire cross-section of the interior of the particle. FIG. 4 shows that the phosphorus content of the same particle is evenly distributed over the entire cross-section of the particle. FIG. 6 shows that the aluminum is likewise evenly distributed over the entire cross-section. This evidence appears to show that the material of the present invention has a calcium rich outer layer superimposed on a core of material which is not calcium rich in contrast to that of the prior art.

The calcium treated potassium modified sodium aluminum phosphate is characterized by a more uniform consistency, is more easily handled and has a lower hygroscopicity than the potassium modified SALP alone.

The calcium treated potassium modified SALP particles are harder than the non-potassium containing SALP particles. The particle hardness contributes to the improved handlability of the product.

In addition, the material dries quickly and granulates easily. Mill down times for cleaning have been decreased over the non-calcium treated potassium modified SALP due to improved milling properties. Increased density of the calcium treated potassium modified SALP improves packaging operations. Bags and drums are easily filled with sufficient space remaining to make quick and positive closures.

As noted previously, good dust and flow characteristics of leavening acids such as the calcium treated SALP or potassium modified SALP are extremely important in plants which mix and package dry mixes for the preparation of baked products and the like, by using automatic feeders for metering the ingredients. The leavening acid is generally placed in storage bins having funnel-like openings at the bottom. Ideally, it is desired that the leavening acid be removable from the bins at a steady, controlled rate. However, it has been found during the course of removing the leavening acid from the storage bins, intermittent flow sometimes occurs, and on some occasions, flow will completely cease. This cessation of flow is called "bridging" and is caused by an open path extending from the bottom of the storage bin to the top of the leavening acid. The problems of bridging can sometimes be ameliorated by the addition of flow control agents such as Cab-O-Sil™ (a form of SiO₂ sold by Cabol Chemical Company) or tricalcium phosphate, to the leavening acid. The drawbacks of the approach, however, are that these flow agents are expensive, sometimes unpredictable in the effect they will have on flow characteristics and, unfortunately, can also create dust problems of their own.

The calcium treated SALP's of the present invention have sufficiently improved flow and dust characteristics to overcome a majority of these problems.

The compositions of the present invention are useful as leavening acids in such areas as biscuit mixes, pancake mixes, waffle mixes, cake mixes, doughnut mixes, muffin mixes, self-rising flour and the like. The compositions of the present invention are also effective as leavening acids in moisture containing doughs and liquid batters as they have good holding characteristics, i.e., the ability to be in contact with moisture and bicarbonate of soda without significant loss in leavening acid capabilities. This is a particular advantage in liquid batters such as pancake batter whether made for use within one days time or packaged and sold for latter use. A leavening system in a liquid batter using the product of the invention will not go "flat" after standing for a short period of time. It is also possible to program leavening acid rates of gas relates for specific applications. The ratio of milled to unmilled products of the invention can also be adjusted to program the rate of gas release. Various other materials can also be added to the compositions of the present invention to adjust rate such as mono-calcium phosphate.

Another advantage of the present invention is the ability to add significant quantities of calcium to self-rising four compositions without seriously affecting the rate of leavening action. This is in contrast to the well known fact that blends of monocalcium phosphate and SALP have a fast gas producing rate. This controlled leavening action even in the presence of a calcium surface is a significant improvement in self-rising flours.

The products of the present invention are also less hygroscopic than normal SALP materials or potassium modified SALP's as disclosed in U.S. application Ser. No. 671,769. This allows for easier plant processing of the material. Mills and screens do not become caked after short periods of use as with the prior art material. The decreased hygroscopicity also increases the storage stability of the dried product itself as well as dried blends using the same. Decreased hygroscopicity allows the user a wider range of use since the user can leave the product open on the floor without fear of excessive caking.

The invention will be illustrated in the Examples which follow.

EXAMPLES 1–11

Calcium containing potassium modified sodium aluminum phosphates are prepared as follows:

A reaction slurry was prepared by treating 60% phosphoric acid with a sufficient amount of potassium hydroxide to provide an analysis of $0.8\pm0.2$ weight percent potassium oxide ($K_2O$) in the final product. The potassium treated phosphoric acid was then reacted with a sufficient amount of dry sodium carbonate ($Na_2CO_3$) to provide an analysis of $2.8\pm0.2$ weight percent sodium oxide ($Na_2O$) in the final product. These percentages were used unless otherwise noted in Table I. The temperature was kept above 40° C. to prevent sodium and/or potassium phosphate crystallization.

After adjusting the temperature of the mixture to above 80° C., alumina trihydrate was then admixed with the sodium/potassium treated phosphoric acid in a quantity less than the amount needed to form a 1:3:8 sodium aluminum phosphate. The amount of alumina added is recorded in Table I. The addition of the aluminum trihydrate was accomplished incrementally with slow agitation to insure uniform mixing of the aluminum trihydrate in the acid. The mixture was then reacted for the time given in Table I at a temperature of about 110° C. to form a reacted slurry.

A small quantity (See Table I) of the reacted slurry was placed in a tube shaped covered jacketed mixer having two contrarotating mixing arms with downwardly dependent mixing blades. The cover was provided with an ingredient inlet and a steam outlet. After covering the tub, the hydrated lime was added at a controlled rate. Process variations are shown in Table I. After the lime had reacted, the product was dried while under sufficient mixing to granulate the product.

The dried product was finally milled in a Raymond Laboratory Hammer Mill fitted with a screen having 1/16 inch (1.59 mm) openings. The product had the elemental analysis and sieve analysis as shown in Table II.

TABLE I

| Example | 1 | 2 | 3 | 4 | 5 | 6 | 7 | 8 | 9 | 10 | 11 |
|---|---|---|---|---|---|---|---|---|---|---|---|
| Amount Alumina trihydrate % Added to original slurry (100%) = 3370 lbs.) lbs. | 90 3033 | 46.6 1570 | 68.2 2300 | 68.2 2300 | 68.2 2300 | 89 3000 | 89 3000 | 50 1685 | 50 1685 | 100 3370 | 100 3370 |
| Minutes in Reactor | — | 15 | 15 | 20 | 20 | 20 | 20 | 30 | 30 | — | — |
| $K_2O$ reported if % changed | — | — | — | 0.67 | 0.67 | 0.71 | 0.71 | 0.78 | 0.78 | | |
| $Na_2O$ % | — | — | — | 2.90 | 2.90 | 2.68 | 2.68 | 2.75 | 2.75 | | |
| Reactor Slurry lbs. | 12 | 12 | 11 | 8.5 | 8.5/85° | 10.5 | 8.4/85° | 8.25 | 8.75/85° | 10.85 | 7.0 |
| Calcium (Hydrated Lime) gms | 146 | 1020 | 550 | 429 | 429 | 128 | 102 | 668 | 85 | 24.7 | 63.5 |
| Amount Reg. to Neutralize | 194 | 1039 | 560 | 438 | | 186 | 149 | 665 | 84 | — | — |
| Mixer Speed - High | | | | X | X | — | — | — | — | X | X |
| Mixer Speed - Low | | | | X | X | X | X | X | X | X | X |
| Order of addition | A | A | A | A | B | A | A | A | A | A | A |
| Time Ca(OH)₂ addition | — | 300 g. increments 2-3 mins. | | ½-2 min. | — | 1 min. | 1 min. | 6 min. | — | — | — |
| Mixing Time | | | | 40 | 40 | 70 | 30 | 50 | 30 | 60 | 40 |
| Temperature - Initial °C. | — | 100 | 100 | 90 | 85 | 80 | 85 | 94 | 100 | — | — |
| After Ca(OH)₂ °C. | — | 115 | 110 | 106 | 108 | 94 | 98 | 118 | 121 | 5–90 | 100–180 |
| Final (after °C. | 85° | 100 | 95 | 90–110 | 108–120 | 80–90 | 90–102 | 100–110 | 100–120 | — | — |

TABLE I-continued

| Example | 1 | 2 | 3 | 4 | 5 | 6 | 7 | 8 | 9 | 10 | 11 |
|---|---|---|---|---|---|---|---|---|---|---|---|
| granulation) | | | | | | | | | | | |

A = Lime to slurry
B = Slurry to Lime

TABLE II

| Example | 1 | 2 | 3 | 4 | 5 | 6 | 7 | 8 | 9 | 10 | 11 |
|---|---|---|---|---|---|---|---|---|---|---|---|
| Neutralizing Value | 98.2 | 86.4 | 86.6 (−60m)88.0 | 90.8 | 91.8 | 97.4 | 97.0 | 87.2 | 80.4 | 97.2 | 93.8 |
| Loss on Ignition (LOT) 90 | — | 17.76 | 18.83 | 18.95 | 19.2 | 21.6 | 20.9 | 18.01 | 15.8 | 21.3 | 21.2 |
| Free Acid (Acetone Free Acid) 90 | — | 0.49 | 0.78 | 0.39 | 0.69 | 0.10 | 0.20 | 0.15 | 0.20 | 0.10 | 0.05 |
| CaO 90 | 2.3 | 14.2 | 10.51 (−60m) | 8.26 | 7.41 | 2.62 | 2.62 | 14.08 | 16.47 | 0.97 | 2.0 (−60m)2.05 |
| $P_2O_5$ % | — | — | — | 57.7 | — | 58.0 | — | 57.2 | — | 58.9 | |
| $Al_2O_3$ % | — | 7.24 | 11.57 | 11.3 | 11.21 | 15.2 | 15.2 | 8.1 | 7.9 | 16.1 | 16.1 |
| $K_2O$ % | — | 0.78 | 0.68 | 0.68 | — | 0.72 | — | 0.73 | — | 0.71 | — |
| $Na_2O$ % | — | 2.70 | 2.55 | 2.55 | — | 2.60 | — | 2.60 | — | 2.70 | — |
| Sieving Data | | | | | | | | | | | |
| Percent by Weight | | | | | | | | | | | |
| on 60 | 12.2 | 18.8 | 29.3 | 19.1 | 22.9 | 29.5 | 14.2 | 27.5 | 32.3 | 33.7 | 30.0 |
| through 60 on 100 | 19.2 | 21.5 | 23.6 | 19.2 | 19.1 | 21.0 | 22.4 | 18.5 | 19.6 | 19.5 | 20.5 |
| through 100 on 140 | 15.8 | 14.0 | 11.8 | 14.6 | 10.0 | 11.3 | 14.5 | 12.2 | 11.5 | 10.1 | 10.9 |
| through 140 - remainder | 53.0 | 45.7 | 35.1 | 47.1 | 48 | 38.2 | 48.9 | 41.8 | 36.6 | 36.7 | 38.0 |

A standard method for evaluating baking performance of a leavening acid is the baking powder rate of reaction test (BPRR). In this test, a baking powder is formulated comprising a leavening acid, sodium bicarbonate, starch and water. The purpose of the BPRR test is to observe and measure the rate of carbon dioxide discharge from the baking powder as a means of evaluating the suitability and quality of the leavening acid candidate as a baking acid.

Ideally, there should be a sufficient initial release of carbon dioxide in the baking mix to facilitate mixing and blending of the constituents. The mixture should also be capable of suppressing the release of carbon dioxide until such time as the mix is placed in an oven and heated, whereupon more carbon dioxide is released during baking. The BPRR test is conducted at a temperature of 27° C.±0.5° C. The leavening acid and sodium bicarbonate are used in proportions that are theoretically capable of liberating 200 cc of carbon dioxide. More details regarding reaction rate testing, as well as the apparatus required, are found in *Cereal Chemistry*, Volume 8, pages 423–433 (1933). The baking powder rate of reaction tests for Examples 1–11 are given in Table III.

TABLE III

| Example | 2 min. | 4 min. | 10 min. |
|---|---|---|---|
| 1 | 48 | 61 | 85 |
| 2 | 66 | 77 | 92 |
| 3 | 50 | 64 | 84 |
| 4 | 63 | 79 | 103 |
| 5 | 58 | 72 | 94 |
| 6 | 45 | 61 | 85 |
| 7 | 46 | 59 | 85 |
| 8 | 63 | 73 | 96 |
| 9 | 44 | 56 | 75 |
| 10 | 40 | 57 | 85 |

TABLE III-continued

| Example | 2 min. | 4 min. | 10 min. |
|---|---|---|---|
| 11 | 31 | 45 | 67 |
| −60m | 38 | 51 | 75 |

−60m = through 60 mesh

EXAMPLES 12–15

A slurry of potassium modified sodium aluminum hydrated phosphate was prepared as in Example 1. After cooling to about 80° C., lime was then incrementally added to the reaction mass in the reactor and agitated for reaction periods of about 1–4 minutes between additions. The conditions of reaction are given in Table IV.

The slurry of calcium treated potassium modified sodium aluminum phosphate is directed to a Kneadermaster kneader-conveyor blender or mixer, wherein the material is dried and granulated. The conditions of the Kneadermaster blender are maintained so that the dry calcium treated potassium modified SALP exiting the Kneadmaster has a loss on ignition (LOI) of about 22 weight percent.

After exiting the Kneadmaster the calcium treated potassium modified SALP proceeds to a mill and air classification system wherein the product is milled and classified by particle size in an air separator. The sieving analysis is shown in Table V. The calcium treated potassium modified SALP product is then in a commercial form ready to be packaged and shipped. The LOI of the finished potassium modified SALP product is from about 19.5 to 20.5 weight percent.

The product was free flowing, non-dusting and did not blind the screens when milled. The analysis for the product is given in Table V.

TABLE IV

| Example | | 12 | 13 | 14 | 15 |
|---|---|---|---|---|---|
| Percent Alumina Trihydrate | % | 89 | 89 | 96.4 | 91 |
| Added to Slurry/lbs. | Lbs. | 3000 | 1100 + 1900 | 3250 | 3070 |
| Calcium (hydrated Lime)/lbs. | | 400 | 400 | 100 | 300 |
| Amount Required to Neutralize/lbs. | | 526.5 | 526.5 | 171 | 427 |

TABLE IV-continued

| Example | 12 | 13 | 14 | 15 |
|---|---|---|---|---|
| How Added | Dry | Dry | Slurry 37 gal. $H_2O$ 56° C. | Slurry 70 gal. $H_2O$, 55° C. |
| Order of Addition | Al/Ca | Al/Ca/Al | — | — |
| Time of Ca(OH)$_2$ Addition | 60lbs/min. Add 2-6 min. react 1-3 min. | 50 lbs/min. Add 1-2 min. react 2-4 min. | | |
| Temperature During Lime Addition | — | — | 125° C. | 125° C. |

TABLE V

| Examples | | 12 | 13 | 14 | 15 |
|---|---|---|---|---|---|
| Neutralizing Value | | 98.6 | 101.2 | 100.0 | 101.0 |
| Loss on Ignition (LOI) | % | 20.52 | 19.85 | 20.16 | 20.08 |
| CaO | % | 2.34 | 1.82 | 0.50 | 1.40 |
| $P_2O_5$ | % | 58.35 | 60.00 | 59.60 | 60.20 |
| $Al_2O_3$ | % | 15.21 | 14.84 | 16.24 | 15.15 |
| $N_2O$ | % | 0.72 | 0.75 | 0.76 | 0.78 |
| $Na_2O$ | % | 2.75 | 2.80 | 2.80 | 2.85 |
| Sieving Analysis Percent by weight | | | | | |
| on 60 | | 0.6 | 0.8 | 0.6 | 1.5 |
| Through 60 on 100 | | 3.4 | 5.7 | 8.6 | 6.8 |
| Through 100 on 140 | | 4.0 | 10.4 | 17.5 | 9.7 |
| Through 140 Remainder | | 92 | 83.1 | 73.3 | 82 |

TABLE VI

| EXAMPLES | 16 | | | 17 | | | 18 | | | 19 | | |
|---|---|---|---|---|---|---|---|---|---|---|---|---|
| Reactants | | | | | | | | | | | | |
| $H_3PO_4$ | 646.7g/75% acid | | | 600g/85% acid | | | 623 g/85% acid | | | 732 g/85% acid | | |
| $Na_2CO_3$ | 24.1 g | | | 18.94 g | | | 32.94 g | | | 42.06 g | | |
| KOH | — | | | 0g of 45% sol. | | | 6.73 g of 45% sol. | | | — | | |
| $Al_2O_3 \cdot 3H_2O$ | 106 g | | | 10.6 g | | | 110.7 g | | | 130.0 g | | |
| $Ca(OH)_2$ | 65.05 g | | | g | | | 67.50 g | | | 79.3 g | | |
| Molar Amounts Moles | TOTAL | Moles for 1:3:8 SALP | Excess | TOTAL | Moles for 1:3:8 SALP | Excess | TOTAL | Moles for 1:3:8 SALP | Excess | TOTAL | Moles for 1:3:8 SALP | Excess |
| P | 4.99 | 3.64 | 1.31 | 5.20 | 3.64 | 1.56 | 5.40 | 3.79 | 1.61 | 6.35 | 4.44 | 1.91 |
| Na or Na + K | 0.46 | 0.46 | 0 | .65 | 0.46 | .19 | 0.68 | 0.47 | .21 | 0.79 | 0.56 | 0.23 |
| Al | 1.37 | 1.37 | 0 | 1.37 | 1.37 | 0 | 1.42 | 1.42 | 0 | 1.67 | 1.67 | 0 |
| Moles Ca | 0.88 | | | 0.88 | | | 0.91 | | | 1.07 | | |
| Moles Ca/Moles Excess acid | 0.67 | | | 0.56 | | | 0.56 | | | 0.56 | | |

EXAMPLES 16-19

In a reactor fitted with a condenser, thermometer and mechanical stirrer was placed phosphoric acid in the amounts given in Table VI. The acid was heated to assist in dissolving the ingredients to be added (about 40°-50° C.). Sodium carbonate and, in some instances, potassium hydroxide (in a 45% aqueous solution) were slowly added to the heated acid at such a rate that the reaction was allowed to subside. The amount added is given in Table VI. A clear solution was obtained. The temperature of this solution was adjusted to 80°-85° C. Hydrated alumina ($Al_2O_3 \cdot 3H_2O$) was slowly added to this solution at 80°-85° C. over a 1 hour period. The amount of hydrated alumina added is given in Table VI. The temperature of the mixture increased to 110°-120° C. After all the hydrated alumina was added, the mixture was allowed to react about ½ hour at 110°-120° C. A white viscous slurry was obtained.

The slurry was transferred to the mixer bowl of a kitchen type mixer. Hydrated lime in the amount given in Table VI was added to the slurry. The slurry was mixed at low speed scraping the walls of mixer bowl until the lime was well blended. A white and creamy material was obtained.

This material was transferred to a farinograph (a jacketed sigma bladed blender) which was held at 98° C. to granulate and dry the product. Time required to dry averaged 30-45 minutes. On occassion soft lumps were formed when too much material was being dried. The soft lumps were broken up before the product had completely dried and drying was continued. A fine white powder was obtained.

EXAMPLE 20

Control: Preparation in accordance with U.S. Pat. No. 2,550,490

In a reactor fitted with a condenser, thermometer and stirrer were placed 844 grams of 75% phosphoric acid. The acid was heated to 70° C. and 27 grams of sodium carbonate was slowly added. The mixture was allowed to react until a clear solution was obtained. The clear solution was heated to 90° C. and 114.5 grams of hydrated alumina was added at such a rate that the charge did not boil over (about 20 minutes). The condenser was removed and the charge was allowed to boil down until a white viscous slurry was obtained. Initial temperature was 135° C. Evaporation temperature was generally about 115°-120° C.

The slurry was transferred to the bowl of a home-type mixer containing 11.84 g of hydrated lime. The slurry and lime were mixed at low speed until well blended. A white and creamy material was obtained. This material was transferred to a Hobart mixer and mixed until it solidified into large lumps. The product was oven dried at 98° C. for four hours. The product was milled in Raymond Laboratory Hammer Mill, fitted with a screen. The elemental and sieving analyses are given in Table VII.

TABLE VII

|  | TOTAL | Moles Required for 1:3:8 SALP | Excess |
|---|---|---|---|
| Moles P | 6.46 | 3.92 | 2.54 |
| Moles Na | 0.51 | 0.49 | 0.02 |
| Moles Al | 1.47 | 1.47 | 0 |
| Moles Ca | 1.60 | | |
| Moles Ca/ Moles Excess P | 0.63 | | |
| Excess Na/ Moles | 0.02 | | |
| Sieving Analysis | | | |
| on 60 | 8% | | |
| through 60 on 100 | 42% | | |
| through 100 on 140 | 20% | | |
| through 140 | 30% | | |

The compounds of the present invention can be used effectively in preparing self-rising flour biscuits.

Self-rising flour (on SRF) is defined in the Federal Register of May 2, 1961, Title 21, Part 15, section 15.50(a), Definition and Standards of Identity, as follows:

"Self-rising flour, self-rising white flour, self-rising wheat flour, is an intimate mixture of flour, sodium bicarbonate, and one or more of the acid-reacting substances monocalcium phosphate, sodium acid pyrophosphate, and sodium aluminum phosphate. It is seasoned with salt. Then it is tested by the method prescribed in paragraph (c) of this section not less than 0.5 percent of carbon dioxide is evolved. The acid-reacting substance is added in sufficient quantity to neutralize the sodium bicarbonate. The combined weight of such acid-reacting substance and sodium bicarbonate is not more than 4.5 parts to each 100 parts of flour used."

The term "self-rising-flour" used herein is intended to describe compositions within the definition set forth above.

Baking response was determined by adding a specified portion of the product of the invention to a standard self-rising flour formulation comprising:

| | | |
|---|---|---|
| Sodium Bicarbonate | 3.3 gms | |
| Leavening Acid | See TAble VIII | Self-rising |
| Salt | 5.4 gms | Flour Mixture |
| Flour | 240 gms. | |
| Shortening | 32 gms | |
| Milk | 165-170 cc. | |

The amount of leavening acid required can be determined by its neutralizing value. Its neutralizing value is a measurement of the parts by weight of sodium bicarbonate which will be neutralized by exactly 100 parts by weight of a given leavening acid. The amount of leavening acid required was obtained by multiplying the amount of sodium bicarbonate used (in this case 3.3 gms) by 100 and dividing the result by the neutralizing value of the leavening acid. This amount was added to the self-rising flour formulation. Biscuit were baked under controlled conditions as follows:

(1) Heat electric oven to 340° F.;
(2) Weigh out self-rising flour, shortening and milk;
(3) Cut shortening into self-rising flour in Hobart blender for 1½ minutes until mix is fine and crumbly;
(4) roll on cloth covered board with ½" gauge rails using dusting flour and cloth covered rolling pin;
(5) Cut dough with 2 inch cutter and bake 18 minutes at 450° F.

Biscuit bake tests and evaluation of the results therefrom is explained in Cereal Laboratory Methods, 6th Ed., American Association of Cereal Chemists, 1957 pp. 46–48. The results of the biscuit bakes including the amount of leavening acid used are reported in Table VIII. The biscuit weight is the weight of 7 biscuits just after baking. The six most evenly sloped biscuits are then measured to provide biscuit height in inches. The volume is the number of cc's of rope seed displaced by six biscuits. The specific volume is obtained by dividing the volume by biscuit weight. Amount of acid used, dough weight and biscuit weight are in grams.

TABLE VIII

Baking Results - Biscuits

| Product of | Condition of Particles | Neutralizing Value | Amount Acid Used | Dough Weight | Biscuit Weight | Height | Volume | Specific Volume | Comments | pH |
|---|---|---|---|---|---|---|---|---|---|---|
| Example 1 | as is | 98.2 | 3.35 | 235 | 210 | 9 | 550 | 2.62 | a & d | 7.79 |
| Example 1 | −60 m | 98.2 | 3.35 | 232 | 204 | 9 | 530 | 2.60 | a & d | 7.54 |
| Example 2 | as is | 86.2 | 3.85 | 235 | 210 | 9¼ | 540 | 2.54 | a,d & b | 7.81 |
| Example 2 | −60 m | 86.2 | 3.85 | 230 | 200 | 9 | 520 | 2.60 | a & d | 7.72 |
| Example 3 | as is | 86.6 | 3.80 | 232 | 206 | 9¼ | 550 | 2.67 | a & c | 7.84 |
| Example 3 | −60 m | 86.6 | 3.80 | 230 | 201 | 9 | 540 | 2.69 | a & d | 7.70 |
| Example 14 | as is | 100 | 3.3 | 230 | 203 | 9¼ | 560 | 2.76 | d & g | 7.70 |
| Example 15 | as is | 101 | 3.3 | 235 | 207 | 9¼ | 575 | 2.78 | e & b | 7.42 |

[a] yellowish crumb
[b] white crumb
[c] alkaline
[d] slightly alkaline
[e] normal
[f] black specks
[g] slightly yellowish crumb The products of the present invention were tested in a doughnut dough reaction rate test. The doughnut dough reaction rate test is an analytical method used for reactivity studies of baking acids. The test procedure involves reacting the acid with sodium bicarbonate while the reactants are suspended in a moist doughnut dough at a temperature of 27° C.±0.5° C. The proportions of acid and bicarbonate employed are those which are capable of theoretically liberating 200 cc. of $CO_2$ gas as 0° C. The remainder of the ingredients are outlined in a paper on reaction rate testing which appeared in Cereal Chemistry, Vol. 8, American Association of Cereal Chemists, St. Paul, Minnesota, 1931, pp. 423–33. Both milled and unmilled samples were tested. The results are reported in Table IX below. All results are relative to the bicarbonate of soda blank or control.

TABLE IX

| Product of Example | % CaO | Doughnut Dough Rate of Reaction Minutes | | | % on 80 mesh |
|---|---|---|---|---|---|
| | | 2 | 15 | Δ | |
| 1 | 2.3 | 42 | 54 | 12 | 12.2 |
| 3 | 10.5 | 51 | 65 | 14 | 29.3 |
| 2 | 14.2 | 60 | 78 | 18 | 18.8 |
| 14 | .5 | 43 | 56 | 13 | 0.6 |
| 15 | 1.4 | 49 | 64 | 15 | 1.5 |
| Product of U.S. Application Ser. No. 671,769 | 0 | 42 | 36 | 14 | — |
| Bicarbonate of Soda Blank | 0 | 31 | 3 | 4 | — |

Doughnut dough rate of reaction tests were conducted on a single sample milled and unmilled at the same particle size. The data as reported in the Table X below shows that milled samples of the same particle size generally have a faster rate of reaction than the unmilled.

Similar studies are also reported in Table X.

TABLE X

DOUGHNUT DOUGH RATE OF REACTION TEST ON SIEVED FRACTIONS OF THE PRODUCT OF EXAMPLE 5

| | DOUGHNUT DOUGH RATE OF REACTION IN MINUTES | | | | | |
|---|---|---|---|---|---|---|
| | Unmilled | | | Milled | | |
| Mesh | 2 | 15 | Δ | 2 | 15 | Δ |
| 60–100 | 46 | 61 | 15 | 47 | 61 | 15 |
| 100–140 | 44 | 59 | 15 | 48 | 62 | 14 |
| 140–200 | 49 | 66 | 17 | 55 | 76 | 21 |
| 200–400 | 48 | 66 | 18 | 52 | 72 | 20 |
| Soda Blanks | 29–32 | 32–36 | 3–4 | | | |

| Sieving, % By Weight | Unmilled | Milled |
|---|---|---|
| On 60 | 64.5 | 24.7 |
| Through 60 On 100 | 13.8 | 23.2 |
| Through 100 On 140 | 6.4 | 12.4 |
| Through 140 On 200 | 6.4 | 15.8 |
| Through 200 On 400 | 5.3 | 17.8 |
| Through 400 | 3.6 | 6.1 |

| Product of Example 5: | 70% Alumina |
|---|---|
| | 91.8 Neutralizing Value |
| | $K_2O$ = .67% |
| | $Na_2O$ = 2.90% |

TABLE XI

DOUGHNUT DOUGH RATE OF REACTION ON SIEVE FRACTIONS

| Product of Example | Mesh Fraction | Type | Doughnut Dough Rate of Reaction Minutes | | |
|---|---|---|---|---|---|
| | | | 2 | 15 | Δ |
| 6 | 60–100 | Unmilled | 36 | 49 | 13 |
| 6 | 60–100 | Milled | 38 | 50 | 12 |
| 20 | 60–100 | Milled | 71 | 95 | 18 |
| 20 | 140–200 | Milled | 75 | 93 | 18 |
| 16 | 60–100 | Unmilled | 47 | 64 | 17 |
| 16 | 60–100 | Milled | 45 | 63 | 18 |
| 16 | 140–200 | Unmilled | 49 | 70 | 21 |
| 16 | 140–200 | Milled | 55 | 75 | 20 |
| 19 | 60–100 | Unmilled | 52 | 78 | 26 |
| 19 | 60–100 | Milled | 63 | 86 | 23 |
| 19 | 140–200 | Unmilled | 70 | 94 | 24 |
| 19 | 140–200 | Milled | 75 | 100 | 25 |
| 3 | 140–200 | Milled | 54 | 75 | 21 |

Blends of potassium modified SALP and anhydrous monocalcium phosphate were prepared. An increased rate in the doughnut rate of reaction was obtained as is shown in Table XII which follows

Table XII

Doughnut Dough Rate Of Reaction Tests On Various Leavening Acids

| Material | Amount-Grams | Doughnut Dough Rate Of Reaction In Minutes | | |
|---|---|---|---|---|
| | | 2 | 15 | Δ |
| Product of Example 3 | .87 | 48 | 61 | 13 |
| Product of U.S. S.N. 671,769 | .74 | 46 | 59 | 13 |
| Anhydrous Monocalcium Phosphate | .94 | 120 | 131 | 11 |
| ⅔ Product of S.N. 671,769 | .49 | 44 | 54 | 10 |
| ⅓ Anhydrous Monocalcium Phosphate | .31 | 61 | 69 | 8 |
| Blend | .49 & .31 | 69 | 84 | 15 |
| Bicarbonate of Soda Blank | — | 37 | 42 | 5 |

Humidification tests were run on a number of samples to determine the amount of moisture pickup over an extended period of time in order to obtain an indication of the hydroscopisity of the sample. The tests were run in accordance with the procedure outlined in U.S. Pat. No. 3,205,073. The following data was obtained:

TABLE XIII

Percent Weight Gain from Original Sample Weight

| Total Time Humidification Days | Product of Example 1 | Product of Example 1 (−60 Mesh) | Product of Example 2 | Product of Example 2 (−60 Mesh) | Product of Example 3 | Product of Example 3 (−60 Mesh) |
|---|---|---|---|---|---|---|
| 1 | 4.88 | 4.84 | 6.14 | 6.40 | 6.00 | 5.94 |
| 2 | 8.98 | 9.10 | 6.90 | 7.10 | 7.86 | 7.66 |
| 3 | 12.28 | 12.08 | 6.90 | 7.14 | 9.00 | 8.88 |
| 6 | 19.44 | 19.40 | 5.96 | 6.30 | 10.70 | 10.94 |
| 7 | 21.48 | 21.52 | 5.76 | 6.10 | 11.28 | 11.18 |
| 8 | 23.38 | 23.12 | 5.34 | 5.70 | 11.90 | 11.96 |
| 9 | 24.68 | 24.06 | 5.06 | 5.40 | 13.20 | 13.20 |
| 10 | 24.84 | 23.96 | 4.72 | 5.06 | 14.22 | 14.48 |
| 13 | 22.96 | 21.80 | 5.12 | 5.56 | 17.94 | 17.69 |
| 14 | 22.22 | 20.51 | 4.94 | 5.22 | 17.42 | 16.90 |
| 15 | 22.32 | 20.70 | 5.25 | 5.30 | 17.16 | 16.06 |
| 16 | 21.18 | | 4.67 | | | |

| Total Time Humidification Days | Product of Example 4 | Product of Example 6 | Product of Example 8 | Product of Example 9 | Product of Example 10 | Product of Example 11 |
|---|---|---|---|---|---|---|
| 1 | 5.12 | 4.88 | 0.4 | 6.32 | 4.72 | 5.44 |
| 2 | 7.06 | 9.38 | 7.86 | 7.32 | 8.38 | 9.48 |

TABLE XIII-continued

Percent Weight Gain from Original Sample Weight

|   | | | | | | |
|---|---|---|---|---|---|---|
| 3 | 7.80 | 13.60 | 8.12 | 7.64 | 11.86 | 12.60 |
| 4 | 8.26 | 17.00 | 8.04 | 8.12 | 14.96 | 15.98 |
| 7 | 10.86 | 23.94 | 17.76 | 9.06 | 24.22 | 23.54 |
| 8 | 11.52 | 23.70 | 17.68 | 9.18 | 25.94 | 24.26 |
| 9 | 12.26 | 22.80 | 18.52 | 9.36 | 27.24 | 30.36 |
| 10 | 13.47 | 22.12 | 18.52 | 9.72 | 27.84 | 31.66 |
| 11 | 14.58 | 21.24 | 18.72 | 10.06 | 27.88 | 27.10 |
| 14 | 20.26 | 20.10 | 19.68 | 11.02 | 25.92 | 40.04 |
| 15 | 20.94 | 19.70 | 19.82 | 11.06 | 25.32 | 39.03 |
| 16 | 20.48 | 19.48 | 20.56 | 18.72 | 25.04 | 36.74 |
| 17 | | 20.40 | 18.44 | 23.30 | | |

| Total Time Humidification Days | Product of Example 14 | Product of Example 14 (+TCP) | Product of Example 15 | Product of Example 15 (+TCP) | Product of A | Product of B |
|---|---|---|---|---|---|---|
| 1 | 7.94 | 7.66 | 7.16 | 5.72 | 8.62 | 3.76 |
| 2 | 13.46 | 11.16 | 10.96 | 9.88 | 13.46 | 7.74 |
| 3 | 16.34 | 15.54 | 14.52 | 13.40 | 16.80 | 11.00 |
| 4 | 20.04 | 18.88 | 17.50 | 16.60 | 20.96 | 14.64 |
| 7 | 26.80 | 25.62 | 23.92 | 22.26 | 30.01 | 24.10 |
| 8 | 27.14 | 26.60 | 25.00 | 23.74 | 31.74 | 26.00 |
| 9 | 26.40 | 26.96 | 25.62 | 24.98 | 33.20 | 27.06 |
| 10 | 26.24 | 26.60 | 26.10 | 26.02 | 34.04 | 27.46 |
| 11 | 25.40 | 25.72 | 26.18 | 26.44 | 33.40 | 26.72 |
| 14 | 24.38 | 24.34 | 26.44 | 26.67 | 31.48 | 24.80 |
| 15 | 24.14 | 24.06 | 25.96 | 26.00 | 30.50 | 24.12 |
| 16 | 24.12 | 24.46 | 25.70 | 25.72 | 29.60 | 23.50 |
| 17 | 23. 8 | 23.46 | | | | |

Foot Note:
A = Product prepared in accordance with U.S. Application S.N. 671,769
B = Same as A; the through 60 mesh fraction
TCP = tricalcium phosphate

Table XIV

A sieving analysis of a 25 gram sample was run on the unmilled products of Examples 5, 17 and 20 as follows (each number has a relative error of up to 5%):

| | Particle Size (Micron) | Example 5 grams | Example 5 % | Example 5 Duplicate % | Example 17 grams | Example 17 % | Example 17 Duplicate % | Example 20 grams | Example 20 % |
|---|---|---|---|---|---|---|---|---|---|
| on 20 | 840 | 7.2 | 29.3 | — | 7.75 | 32.0 | — | 23.35 | 93.4 |
| through 20 on 40 | 420 | 5.55 | 22.6 | — | 2.40 | 9.9 | — | 1.25 | 5.0 |
| through 40 on 60 | 250 | 3.65 | 14.8 | 64.5 | 3.30 | 13.6 | 59.3 | 0.25 | 1.0 |
| through 60 on 100 | 149 | 3.40 | 13.8 | 13.8 | 3.50 | 14.4 | 12.1 | 0.10 | 0.4 |
| through 100 on 140 | 105 | 1.65 | 6.7 | 6.4 | 1.60 | 6.6 | 5.2 | 0.10 | 0.4 |
| through 140 on 200 | 74 | 1.65 | 6.7 | 6.4 | 1.40 | 5.8 | 4.6 | 0.05 | 0.2 |
| through 200 on 400 | 38 | 0.90 | 3.7 | 8.9 | 1.90 | 7.8 | 18.8 | 0 | 0 |
| through 400 | | 0.60 | 2.4 | (T-200) | 2.48 | 9.9 | (T-200) | 0 | 0 |
| | | 24.6 gms | | | | | | | |

| | Sieving Analysis of the On 20 fractions of Examples 5 and 20 | | | | |
|---|---|---|---|---|---|
| | Particle Size (Micron) | Example 5 gms | Example 5 % of Total Sample | Example 20 gms | Example 20 % of Total Sample |
| on 6 | 3360 | 0 | 0 | 12.30 | 49.2 |
| through 6 on 10 | 2000 | 0.2 | 0.8 | 6.10 | 24.4 |
| through 10 on 20 | 840 | 6.8 | 27.6 | 4.80 | 19.2 |
| | | Pan 0.1 | .4 | Pan 0.05 | 0.2 |

EXAMPLE 21

In order to test the holding qualities of the leavening acid of the present invention in liquid batter, pancake batter was prepared and held for various periods of time. Pancakes were baked daily. Volume of gas and bubble formation in the batter and pancakes were noted.

The pancakes were prepared from the following recipe:
3 cups sifted self-rising flour
4 tablespoons sugar
2 eggs, beaten
2⅔ cup milk
6 tablespoons oil The self-rising flour was prepared by blending together:
400 gms. flour
5.5 gms. Sodium Bicarbonate
9.0 gms. salt
3.76 gms. product of example 3

After initial baking, one-fourth cup milk was added to thin the batter slightly. The batter was refrigerated in a covered polypropylene bowl. Pancakes were baked using about one-fourth cup per pancake each day for seven days from the refrigerated batter. The pancakes were observed to have the same similar light texture. The pancakes were tender and pleasant tasting. No pressure build-up was observed in the bowl. The number of bubbles observed during baking appeared to be the same throughout the test period.

EXAMPLE 22

Pancakes were also prepared according to Example 21 using 7.52 grams of the product of Example 3 in place of the 3.76 grams used in Example 21. The batter was prepared in the evening and refrigerated. Pancakes were baked the next day and the following days for a total of eight days.

These pancakes were compared with those made using a commercially available leavening acid prepared in accordance with the process of U.S. Ser. No. 671,769.

The pancakes prepared with the leavening acid of the invention were noticeably lighter than those prepared using the commercial leavening system held for the same length of time. Pancakes made using the leavening acid of the invention had good texture but those with the commercial leavening acid were slightly tough and did not rise as much as based on visual observation.

The invention is defined in the claims which follow. What is claimed is:

1. A process for preparing an alkali metal or ammonium aluminum phosphate composition useful in a leavening system which comprises:
   (a) contacting a slurry of an alkali metal or ammonium aluminum phosphate with a calcium compound which does not interfere with the leavening system, said slurry having an excess of phosphoric acid above the amount needed to form said phosphate and wherein at least a portion of said acid is neutralized by said calcium compound, and
   (b) granulating the product of step (a) while drying under such conditions that a majority of the granulated particles when dried are less than about 840 microns, and at least 90% are less than 2000 microns, said granulated particles of said phosphate having a calcium containing outer surface.

2. The process as recited in claim 1 wherein at least 80% of said excess acid is neutralized.

3. The process as recited in claim 1 wherein said alkali metal is sodium.

4. The process as recited in claim 1 wherein said alkali metal is potassium.

5. The process as recited in claim 1 wherein said alkali metal is a blend of sodium and potassium.

6. The process as recited in claim 1 wherein said calcium compound is selected from the group consisting of calcium oxide, calcium hydroxide, calcium carbonate, and mixtures thereof.

7. The process as recited in claim 1 wherein said excess phosphoric acid is obtained by decreasing the ratio of aluminum to phosphate.

8. In a process for the preparation of an alkali metal aluminum phosphate useful in a leavening system which comprises:
   (a) contacting a food grade phosphoric acid having a concentration of from about 70.0 to about 90.0 weight percent $H_3PO_4$ with a sufficient amount of an alkali metal ion selected from the group consisting of sodium, potassium and mixtures thereof and aluminum ion to form crystals of an alkali metal aluminum phosphate in a slurry; and
   (b) drying and granulating the alkali metal aluminum phosphate; the improvement which comprises:
   (1) contacting said alkali metal aluminum phosphate slurry with a calcium compound subsequent to the initial formation of alkali metal aluminum phosphate crystals in the slurry and prior to the completion of the drying in step (b) under conditions wherein said slurry has an excess of phosphoric acid above the amount needed to form said phosphate in which at least a portion of said excess is neutralized by said calcium compound and wherein the calcium compound does not interfere with the leavening system; and
   (2) granulating said product while drying under such conditions that a majority of the dried granulated particles are less than about 840 microns, and at least 90% are less than 2000 microns, said granulated particles of alkali metal aluminum phosphate having a calcium containing outer surface.

9. The process as recited in claim 8 wherein said alkali metal ion is sodium ion.

10. The process as recited in claim 8 wherein the ratio of the alkali metal:aluminum:$PO_4$ in the final product is about 1:3:8.

11. The process as recited in claim 8 wherein the calcium compound is selected from the group consisting of calcium oxide, calcium hydroxide, calcium carbonate, and mixtures thereof.

12. The process as recited in claim 8 wherein said excess phosphoric acid is obtained by adjusting the ratio of $H_3PO_4$, alkali metal ion, and aluminum ion such that after adding the aluminum there is at least an excess of phosphoric acid, at least a portion of said excess being neutralized with said calcium compound.

13. The process as recited in claim 12 wherein the ratio of aluminum to phosphate is decreased to provide the excess phosphoric acid.

14. The product formed by the process of claim 1.

15. The product formed by the process of claim 10.

16. The product formed by the process of claim 13.

17. In a process for the preparation of a potassium modified sodium aluminum phosphate useful in a leavening system which comprises:
   (a) contacting a food grade phosphoric acid having a concentration of from about 70.0 to about 90.0 weight percent $H_3PO_4$ with a sufficient amount of potassium ion and a sufficient amount of sodium ion to provide a sodium/potassium treated phosphoric acid;
   (b) contacting the sodium/potassium treated phosphoric acid with an aluminum compound to form a potassium modified sodium aluminum phosphate crystalline slurry; and
   (c) drying and granulating the potassium modified sodium aluminum phosphate; the improvement which comprises:
   (1) contacting said potassium modified sodium aluminum phosphate slurry with a calcium compound subsequent to the initial formation of potassium modified sodium aluminum phosphate crystals in the slurry in step (b) and prior to the completion of the drying in step (c) under conditions wherein said slurry has an excess of phosphoric acid above the amount needed to form said phosphate in which at least a portion of said excess is neutralized by said calcium compound and wherein the calcium compound does not interfere with the leavening system; and
   (2) granulating said product while drying under such conditions that a majority of the dried granulated particles are less than about 840 microns, and at least 90% are less than 2000 microns, said granulated particles of potassium modified sodium aluminum phosphate having a calcium containing outer surface.

18. The process as recited in claim 17 wherein said potassium ion is provided by a compound selected from the group consisting of potassium hydroxide, potassium carbonate, and potassium phosphate and mixtures thereof.

19. The process as recited in claim 17 wherein said sodium ion is provided by a compound selected from the group consisting of sodium carbonate, sodium hydroxide, sodium bicarbonate and sodium phosphate and mixtures thereof.

20. The process as recited in claim 17 wherein the ratio of Na+K:Al:PO$_4$ in the final product is about 1:3:8.

21. The process as recited in claim 17 wherein said excess phosphoric acid is obtained by adjusting the ratio of sodium ion, potassium ion, aluminum and H$_3$PO$_4$ such that after adding the aluminum there is at least an excess of phosphoric acid, said excess being neutralized with said calcium compound.

22. The process as recited in claim 13 wherein the ratio of aluminum to phosphate is decreased to provide said excess phosphoric acid.

23. The process as recited in claim 17 wherein said calcium compound is selected from the group consisting of calcium oxide, calcium hydroxide, calcium carbonate, and mixtures thereof.

24. The product formed by the process of claim 13.

25. In a method for preparing a baked good or the doughs or batters therefor which is leavened with the aid of a leavening acid the improvement which comprises using for at least a portion of said leavening acid the product of claim 14.

26. The method as recited in claim 14 wherein said baked good is selected from the group consisting of biscuits, and pancakes.

27. A self-rising flour including for at least a portion of its leavening acid, the product of claim 14.

* * * * *

UNITED STATES PATENT AND TRADEMARK OFFICE
CERTIFICATE OF CORRECTION

PATENT NO. : 4,196,226
DATED : April 1, 1980
INVENTOR(S) : Robert E. Benjamin

It is certified that error appears in the above-identified patent and that said Letters Patent are hereby corrected as shown below:

At Column 1, line 52, delete "hydroscopic" and insert -- hygroscopic --.

At Column 3, line 65, the formula should read -- $M_{a)} Al_{b)} H_{c)} (PO_4)_{d)} \cdot H_2O_{e)}$ --.

At Column 4, line 6, after the word "letter", delete "e" and insert -- e) --.

At Column 4, line 54, after "850°C.", insert -- preferably about 800°C. --.

At Column 4, line 55, delete "and" and insert -- acid --.

At Column 5, line 6, delete "a" and insert -- an --.

At Column 6, line 14, delete "shows" and insert -- shown --.

At Column 6, line 61, before "agitation", insert -- of --.

At Column 8, line 2, delete "that" and insert -- the --.

At Column 8, line 44, delete "handlability" and insert -- handleability --.

At Column 9, line 27, delete "relates" and insert -- release --.

At Column 9, Table I (bottom), delete "Final (after °C." and insert -- Final (after granulation) °C. --.

At Column 10, line 35, delete "tube" and insert -- tub --.

At Column 10, Table I, Example 10, under Reactor Slurry, delete "10.85" and insert -- 10.88 --.

UNITED STATES PATENT AND TRADEMARK OFFICE
CERTIFICATE OF CORRECTION

PATENT NO. : 4,196,226

DATED : April 1, 1980

INVENTOR(S) : Robert E. Benjamin et al.

It is certified that error appears in the above—identified patent and that said Letters Patent is hereby corrected as shown below:

At Column 10, Table I, Example 10, under After Ca(OH)$_2$ °C., delete "5-90" and insert -- 85-90 --.

At Column 11, Table II, next to Loss on Ignition, delete "(LOT)90" and insert -- (LOI)% --.

At Column 11, Table II, next to Acid), delete "90" and insert -- % --.

At Column 11, Table II, next to CaO, delete "90" and insert -- % --.

At Column 11, Table II, under CaO and Example 2, delete "14.2" and insert -- 14.24 --.

At Column 11, Table II, under through 60 on 100 and Example 3, delete "23.6" and insert -- 23.8 --.

At Column 11, Table II, under through 100 on 140 and Example 1, delete "15.8" and insert -- 15.6 --.

At Column 12, Table II, under through 140-remainder and Example 11, delete "38.0" and insert -- 38.6 --.

At Column 13, Table V, delete "N$_2$O" first occurrence (i.e., beneath Al$_2$O$_3$) and insert -- K$_2$O --.

At Column 13, Table V, at the end thereof, after "Percent by Weight", please insert -- continued at Column 13, lines 41-45

At Column 13, Table VI, under Na$_2$CO$_3$ and Example 17, delete "18.94g" and insert -- 28.94 g --.

UNITED STATES PATENT AND TRADEMARK OFFICE
CERTIFICATE OF CORRECTION

PATENT NO. : 4,196,226
DATED : April 1, 1980
INVENTOR(S) : Robert E. Benjamin et al.

It is certified that error appears in the above—identified patent and that said Letters Patent is hereby corrected as shown below:

At Column 13, Table VI, under KOH and Example 17, delete "0g" and insert -- 13.0 g --.

At Column 13, Table VI, under $Al_2O_3 \cdot 3H_2O$ and Example 16, delete "106 g" and insert -- 106.47 g --.

At Column 13, Table VI, under $Al_2O_3 \cdot 3H_2O$ and Example 17, delete "10.6 g" and insert -- 106.6 g --.

At Column 13, Table VI, under $Ca(OH)_2$ and Example 17, delete "g" and insert -- 65.05 g --.

At Column 13, Table VI, under Example 16 Total and P, delete "4.99" and insert -- 4.95 --.

At Column 16, line 10, delete "Biscuit" and insert -- Biscuits --

At Column 17, Table IX, at line 5, delete "% on 80 mesh" and insert -- % on 60 mesh --.

At Column 17, Table IX, line 12, under Bicarbonate of Soda Blank and 15, delete "3" and insert -- 35 --.

At Column 18, Table XIII, under Product of Example 8 and 1 day, delete "0.4" and insert -- 6.48 --.

At Column 18, Table XII, under Doughnut Dough Rate of Reaction over the last row of numbers, insert -- $\Delta$ -- (see Table XI for proper position).

At Column 18, line 42, delete "hydroscopicity" and insert -- hygroscopicity --.

UNITED STATES PATENT AND TRADEMARK OFFICE
CERTIFICATE OF CORRECTION

PATENT NO. : 4,196,226

DATED : April 1, 1980

INVENTOR(S) : Robert E. Benjamin et al.

It is certified that error appears in the above-identified patent and that said Letters Patent are hereby corrected as shown below:

At Column 19, Table XIII, under Product of Example 14 and 9 days, delete "26.40" and insert -- 26.80 --.

At Column 19, Table XIII, under Product of Example 14 and 16 days, delete "24.12" and insert -- 24.52 --.

At Column 19, Table XIII, under Product of Example 14 and 17 days, delete "23.8" and insert -- 23.58 --.

At Column 24, line 3, please change the dependency of Claim 22 from Claim 13 to Claim 21.

At Column 24, line 10, please change the dependency of Claim 24 from Claim 13 to Claim 21.

At Column 24, line 16, please change the dependency of Claim 26 from Claim 14 to Claim 25.

Signed and Sealed this

First Day of July 1980

[SEAL]

Attest:

SIDNEY A. DIAMOND

Attesting Officer

Commissioner of Patents and Trademarks